(12) United States Patent
Newton et al.

(10) Patent No.: US 11,110,466 B1
(45) Date of Patent: Sep. 7, 2021

(54) PROCESS FOR CREATING AND BAGGING ANIMAL BEDDING

(71) Applicant: Custom Wood Fibers & Cedar Mulch, LLC, Stillwater, OK (US)

(72) Inventors: Aaron Newton, Stillwater, OK (US); Richard Newton, Marengo, IN (US)

(73) Assignee: Custom Wood Fibers & Cedar Mulch, LLC, Stillwater, OK (US)

( * ) Notice: Subject to any disclaimer, the term of this patent is extended or adjusted under 35 U.S.C. 154(b) by 45 days.

(21) Appl. No.: 16/802,888

(22) Filed: Feb. 27, 2020

(51) Int. Cl.
*B02C 21/00* (2006.01)
*B02C 23/16* (2006.01)
*B02C 13/00* (2006.01)
*B02C 23/38* (2006.01)
*B02C 21/02* (2006.01)

(52) U.S. Cl.
CPC .............. *B02C 21/00* (2013.01); *B02C 13/00* (2013.01); *B02C 21/02* (2013.01); *B02C 21/026* (2013.01); *B02C 23/16* (2013.01); *B02C 23/38* (2013.01); *B02C 2023/165* (2013.01)

(58) Field of Classification Search
CPC ....... B02C 21/00; B02C 21/026; B02C 21/02; B02C 23/38; B02C 2023/16; B02C 13/00
See application file for complete search history.

(56) References Cited

U.S. PATENT DOCUMENTS

| | | | | |
|---|---|---|---|---|
| 4,121,777 A | * | 10/1978 | Kolstad | A01G 3/002 144/24.12 |
| 4,540,032 A | * | 9/1985 | Pelletier | A01G 23/003 144/24.13 |
| 5,271,355 A | | 12/1993 | Bilings | |
| 5,964,187 A | | 10/1999 | Willis | |
| 6,619,234 B2 | | 9/2003 | Sourek, Jr. | |
| 6,698,380 B2 | | 3/2004 | Morrison | |
| 7,610,698 B2 | * | 11/2009 | May | A01G 23/062 144/24.12 |
| 7,617,798 B2 | | 11/2009 | Stevenson | |
| 2003/0122004 A1 | * | 7/2003 | Allen | A01G 23/093 241/24.29 |

* cited by examiner

*Primary Examiner* — Faye Francis
(74) *Attorney, Agent, or Firm* — Bruce P. LaBrie; Resolution Legal Group

(57) ABSTRACT

A method for producing animal bedding is provided. A juniper tree is cut at ground level, the juniper tree having needles and a trunk. The tree is naturally dried until the needles are brown, then ground using a screen less than 3 inches. The ground juniper is hammer milled and dust of 20 mesh minus is extracted from the hammer milled tree, which is then placed in a bagging machine and dust is vacuumed from the juniper tree. The juniper tree is then bagged.

20 Claims, 3 Drawing Sheets

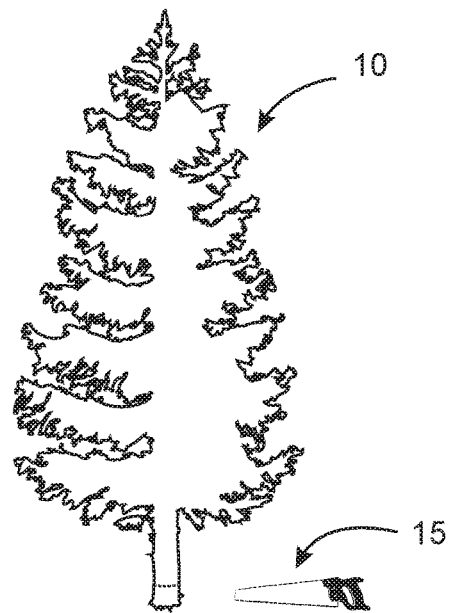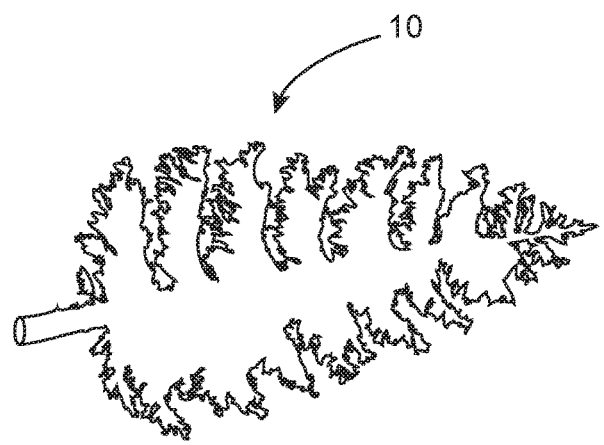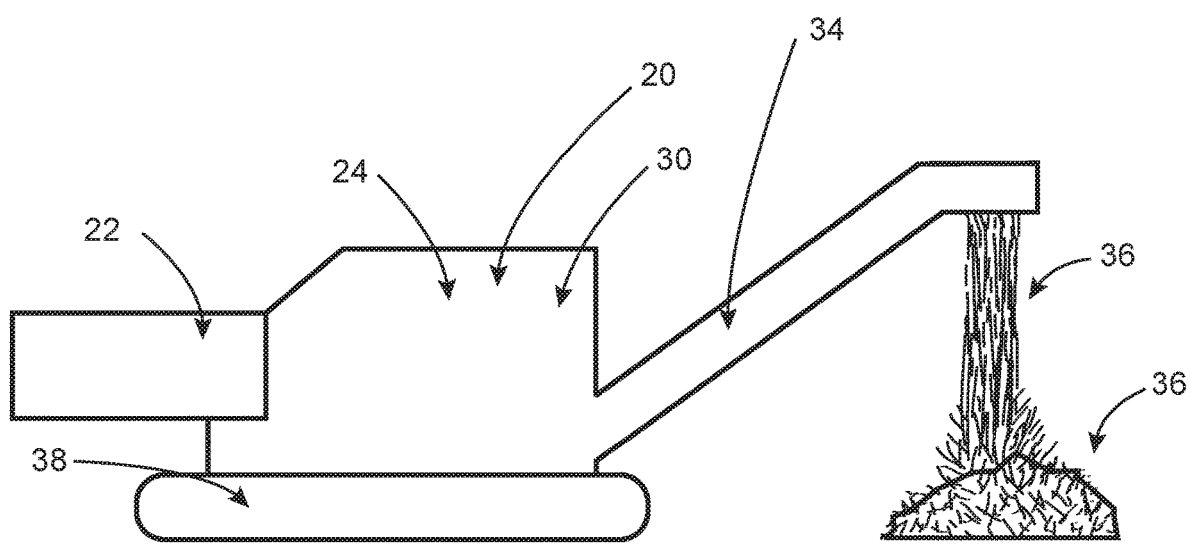
FIG.1
FIG.2
FIG.3

PROCESS FOR CREATING AND BAGGING ANIMAL BEDDING

CROSS-REFERENCE TO RELATED APPLICATION

None.

BACKGROUND

Animal bedding is used in the care of a variety of animal species such as cattle, horses, pigs, goats, and many others. The bedding provides comfort for the animals and helps keep animal pens dry and clean. Bedding often consists of wood based and grass-based products such as western cedar and straw, which can negatively impact animals based on respiratory or allergen problems.

In addition to farming for such things as dairy and food, animals of many species are judged in competitive showings. One of the most important criteria for these show animals is good health, which can manifest itself in strong musculature, healthy fur, and many other visible traits that are indicative of such good health. Bedding that helps contribute to good health is desirable for both food production and show animals.

One method employed by owners of show animals is the use of cold rooms. In order to stimulate the growth of healthy fur a room is provided that is cool and comfortable to the animals. Use of comfortable and healthy bedding in a cold room promotes the growth of healthy fur and prevents disease that would otherwise hinder good health. The bedding also helps the animals keep warm. It is to the provision of animal bedding that is helpful in these endeavors and other improvements that the present invention is directed.

SUMMARY

In one aspect, a method of producing animal bedding is disclosed herein. The method comprises cutting a juniper tree at ground level. The juniper tree has needles, a trunk, and limbs. The method further comprises naturally drying the juniper tree until the needles turn brown. The method also further comprises grinding the dried juniper tree using a screen less than three inches, hammer milling the ground juniper tree, extracting dust of 20 mesh minus, placing the hammer milled juniper tree in a bagging machine, vacuuming dust from the juniper tree, and bagging the juniper tree. Of course, "juniper tree" can also refer to multiple trees, including their needles and trunks.

In another aspect, a method for processing juniper trees is disclosed herein. The method comprises cutting the juniper trees at ground level, naturally reducing the water content of the trees to 20% or less, grinding the dried juniper trees, hammer milling the ground juniper trees, extracting dust of 20 mesh minus from the milled juniper trees. The method further comprises vacuuming dust from the milled juniper trees and bagging the vacuumed juniper trees.

In yet another aspect, a method of producing animal bedding from juniper trees having needles is disclosed herein. The method comprises naturally drying the juniper trees until the needles are brown, grinding the dried trees using a screen less than 3 inches, hammer milling the ground juniper trees using a ½ inch screen, and extracting dust of 20 mesh minus from the hammer milled juniper trees. The method also further comprises placing the hammer milled juniper trees in a compression bagging machine, vacuuming dust from the juniper trees, and bagging the juniper trees in the compression bagging machine.

BRIEF DESCRIPTION OF THE DRAWINGS

The drawings included with this application illustrate certain aspects of the embodiments described herein. However, the drawings should not be viewed as exclusive embodiments. The subject matter disclosed is capable of considerable modifications, alterations, combinations, and equivalents in form and function, as will occur to those skilled in the art with the benefit of this disclosure.

FIG. 1 is an elevational view of a juniper tree during one aspect of a method disclosed herein.

FIG. 2 is an elevational view of the juniper tree shown in FIG. 1 during another aspect of a disclosed method.

FIG. 3 is an elevational view of a grinder in one aspect of a disclosed method.

DETAILED DESCRIPTION

Figure 4:
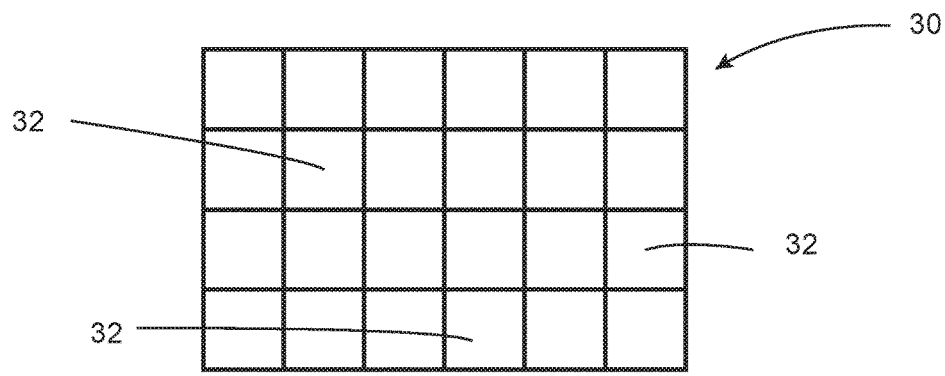
FIG. 4 is a view of a screen for use in the grinder such as that of FIG. 3.

The present disclosure may be understood more readily by reference to this detailed description. Numerous specific details are set forth in order to provide a thorough understanding of the various embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

In one embodiment, the method of producing animal bedding disclosed herein comprises:

a. cutting a juniper tree at ground level, the juniper tree having needles and a trunk;

b. naturally drying the juniper tree until the needles are brown;

c. grinding the dried juniper tree using a screen less than 3 inches;

d. hammer milling the ground juniper tree;

e. extracting dust of 20 mesh minus from the hammer milled tree;

f. placing the hammer milled juniper tree in a compression bagging machine and vacuuming dust from the juniper tree; and g. bagging the juniper tree.

As used herein and in the appended claims, a "juniper tree" means a coniferous tree or shrub in the genus *Juniperus* of the cypress family Cupressaceae. For example, a species of the *Juniperus* genus is *Juniperus Virginiana*, which is also known by names such as red cedar, eastern red cedar, and aromatic cedar (although not a cedar, which is instead in the pine family).

As used herein and in the appended claims, "ground level" means approximately at the level of the growing medium from which the tree grows but may vary somewhat based on the method of cutting and the saw operator. For example, the use of a chainsaw to cut a tree is effective, but chainsaw operators typically avoid contacting ground and dirt with a chainsaw due to potential damage to the saw and chain, so they often leave a small portion above ground level. Based on the size of the tree that is cut, the remaining part of the tree often rises over time because the weight of the tree has been removed and no longer provides a force on the subterranean part of the tree.

As used herein and in the appended claims, "cutting" means any variety of means of cutting a tree trunk or branch, such as a saw, clippers, industrial equipment, specialized cutting tools and vehicles, and any other method of removing all or part of a tree. For example, in addition to a chainsaw as mentioned, specialized industrial saws can be fitted on a skid steer or other mobile equipment for tree cutting and/or removal. Other examples include bull dozers and heavy equipment that removes trees. Some equipment allows the tree to be cut slightly below the surface of the ground, while for others it is preferable to cut above the ground.

As used herein and in the appended claims, "needles", "limbs" and a "trunk" refer to parts of the tree for use in the method disclosed. For example, needles can be leaves of a tree of the sharp or spreading variety, and a trunk is typically the wooden central portion of a tree. Large limbs or branches can also be considered a trunk, as the distinction is not significant, such as when comparing the trunk of a small tree and a branch or limb of a large tree.

As used herein and in the appended claims, "naturally drying" refers to a process of allowing natural processes to eliminate water from the tree. For example, the water content of trees can be in excess of 50%, although this amount can vary by tree, season, and climate. Allowing a cut tree to remain in a field or other outdoor or indoor area for a period of time causes moisture from the tree to evaporate, thereby reducing the moisture content. Natural drying is unlike kiln drying or using some other artificial technique to reduce the moisture content. Measuring the moisture of the tree is not necessary, as the moisture content is typically acceptable when the needles or leaves have turned brown. A suitable water content is about 20% for the purpose of the method herein. For example, leaving a tree in a field for three months or more can make the needles brown and reduce the water content to 20% or less.

As used herein and in the appended claims, "grinding" the dried juniper tree is typically done using a mechanical chopping device or grinder to create small pieces of the tree. For example, Rotochopper® Inc. manufactures a variety of equipment suitable for grinding trees. The size of the ground pieces can be determined based on the use of baffled screens of various sizes. For example, a three-inch screen can be used that will only allow pieces of the tree that are three inches or smaller to pass through the equipment. Other size screens, such as 2.5 inches can be used to only allow ground pieces that are 2.5 inches to pass through.

As used herein and in the appended claims, "hammer milling" is a process by which the ground tree is further reduced in size. For example, the hammer milling process can use screens that will allow only a particular size or smaller to pass through the screen. For example, using a half inch screen will allow only pieces of the trees that are a half inch or smaller to pass through the hammer milling equipment. For example, using a seven sixteenths inch screen will only allow pieces of the tree that are smaller than seven sixteenths inch to pass through the hammer milling equipment.

As used herein and in the appended claims, "extracting dust" means the use of air handling equipment to remove dust from the hammer milled trees. For example, use of a plenum and a baghouse can pull fine particles of dust off the hammer milled trees using a cyclone with the plenum and a vortex within the baghouse created by a fan or blower and an associated motor. Particulate gathers on filters and accumulates as waste product separated from the hammer milled trees. The designation "20 mesh minus" refers to a screen that includes twenty openings in one linear inch of the screen. The "minus" means that all the particles of the designated mesh size would pass through the screen or filter. One problem with the mesh designation is that screens can be constructed of different size wire or other substance that creates differences in the holes for particulate to pass through. Standardized mesh designations therefore can solve the inconsistent measurement of particle size. For example, 20 mesh permits particles that are about 850 microns and smaller to pass. The screens and filters can be constructed of a variety of materials. For example, the screens and filters can be constructed of wire, fabric, or any other material that can be used to construct a screen or filter.

As used herein and in the appended claims, "bagging machine" or "bagger" means equipment used for placing a material in a bag. For example, the hammer milled tree can be placed in a bag constructed of plastic or other material. As another example, the hammer milled tree can be compressed into a particular shape consistent with the shape of the bag. It may be desirable to vacuum dust from the hammer milled tree within the bagging machine, either before, during, or after bagging. For example, one or more locations within the bagging machine can include vacuum ports to which air handling equipment is attached to vacuum dust from the hammer milled tree, thereby taking additional dust from the processed tree.

Referring now to FIGS. 1 and 2 of the drawings, one embodiment of the method disclosed herein will be described. Shown therein is a tree 10, preferably a juniper tree, in a step of the method herein. In FIG. 1, the tree 10 is shown upright as in a growing position. A saw 15 is shown to indicate that the tree 10 is to be cut from its upright position in the ground as indicated in FIG. 1 to another position such as laying down. As suggested above, the saw 15 can be of many forms as needed or desired to cut the tree 10 from its growing position, such as a chainsaw or other specialty equipment designed for cutting the tree 10.

In FIG. 2, the step of naturally drying the tree 10 until the needles of the tree 10 are brown is shown in a presently preferred embodiment. Although the color of the needles generally indicates whether the tree 10 is sufficiently dried pursuant to the method herein, the brown color of the needles typically coincides with a water content of about 20% or less. The brown color and the desired water content usually take place after three to six months of natural drying.

Referring now to FIG. 3, after the tree 10 is sufficiently dried the step of grinding the tree 10 takes place with the grinder 20. In a presently preferred embodiment, the grinder 20 includes a loading bin 22 that includes a conveyer. As the dried tree 10 is placed in the loading bin 22 the conveyer moves the dried tree 10 to a pulverizer in which the tree 10 is repeatedly ground until the pieces are of a sufficient size. In a presently preferred embodiment, the tree 10 is ground into pieces that are approximately 3 inches or less. Referring also to FIG. 4, shown therein is a screen 30 with openings 32. The screen 30 resides in the grinder 20 and permits ground pieces of the tree 10 that are smaller than the openings 32 to pass. For example, a screen with openings 32 that are three inches permit only pieces of the tree 10 that are three inches or smaller to pass through the screen 30. It should be known that the screen 30 is shown as a planar screen, but that many shapes and orientations can be useful depending on the design of the grinder 30. Additionally, baffles within the grinder 30 help to recirculate pieces of the ground tree 10 until such pieces can pass through the screen. The baffles also minimize the production of dust.

Referring still to FIG. 3, after pieces of the tree 10 pass through the screen 30, they are moved by conveyer 34 and exit the grinder 20. In a presently preferred embodiment, pieces of the ground tree 10 exit the grinder 20 as mulch 36 or a mulch-like substance. After this step the tree 10 is preferably ready for a variety of uses, such as garden mulch or other desired uses.

In another presently preferred embodiment, the grinder 20 includes tracks 38 that allow the grinder 20 to be mobile. It is not necessary that the grinder 20 includes tracks, as it can be moved in other ways, such as self-propelled wheels, pulled as a trailer, or it can even be immobile, with the trees 10 shipped to its location for grinding.

Figure 5:
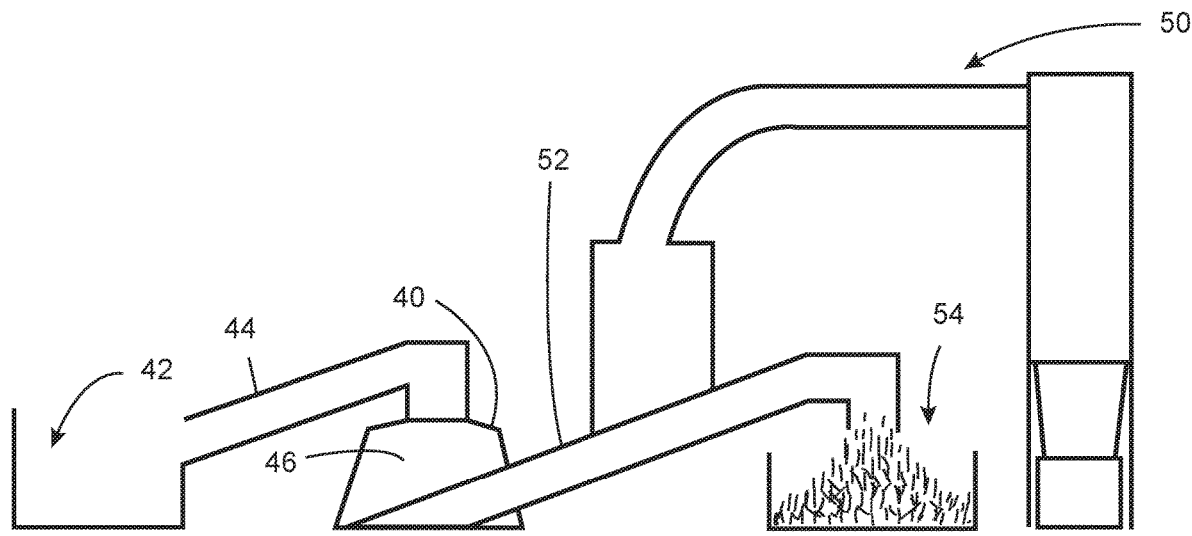
FIG. 5 is a schematic view illustrating use of a hammermill and a baghouse in association with one embodiment of a method disclosed herein.
Figure 6:
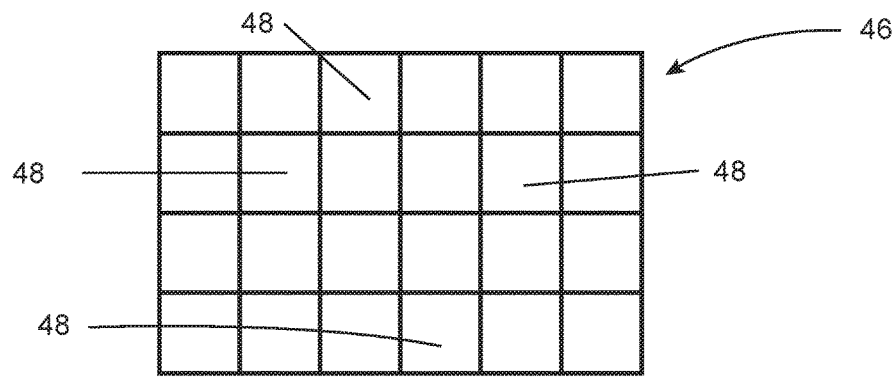
FIG. 6 is a view of a screen for use in a hammermill such as that in FIG. 5.

Referring now to FIG. 5, shown therein is a hammer mill 40 and a baghouse 50. In the hammer milling step, a bin 42 is loaded with the ground trees 10, where a conveyer 44 moves the ground tree 10 into the hammer mill 40. Referring also to FIG. 6, a hammer mill screen 46 with holes 48 resides within the hammer mill 40, where the tree 10 is further processed into a finer particle size. In a presently preferred embodiment, the holes 48 in the hammer mill screen 46 are one half inch and permit particles of the tree 10 that are one half inch or smaller to pass through the holes 48. After the particles pass through the screen 46, the hammer milled tree 10 travels via the auger 52 toward bedding bin 54. In the extracting step a cyclone pulls dust from the hammer milled tree at the plenum 55 by a blower at the baghouse 50. The cyclone has the added benefit of clearing the hammer mill screen 46 during operation.

Still referring to FIG. 5, the dust pulled off the hammer milled tree 10 is blown toward the baghouse 50. In a presently preferred embodiment, a vortex is formed in the baghouse 50 that pulls dust from the hammer milled tree 10. In one preferred embodiment, the vortex is formed with the use of a 20 hp motor with a 36-inch fan. In another presently preferred embodiment, the motor includes variable speed controls to vary the power of the vortex. A very fine particulate is extracted in the baghouse from the processed tree 10. For example, with appropriately sized filters in the baghouse as discussed above, dust of a size approximately 20 mesh minus is extracted from the processed tree 10. Finer or courser dust can also be extracted by adjusting the fan speed and the baghouse filter size.

Figure 7:
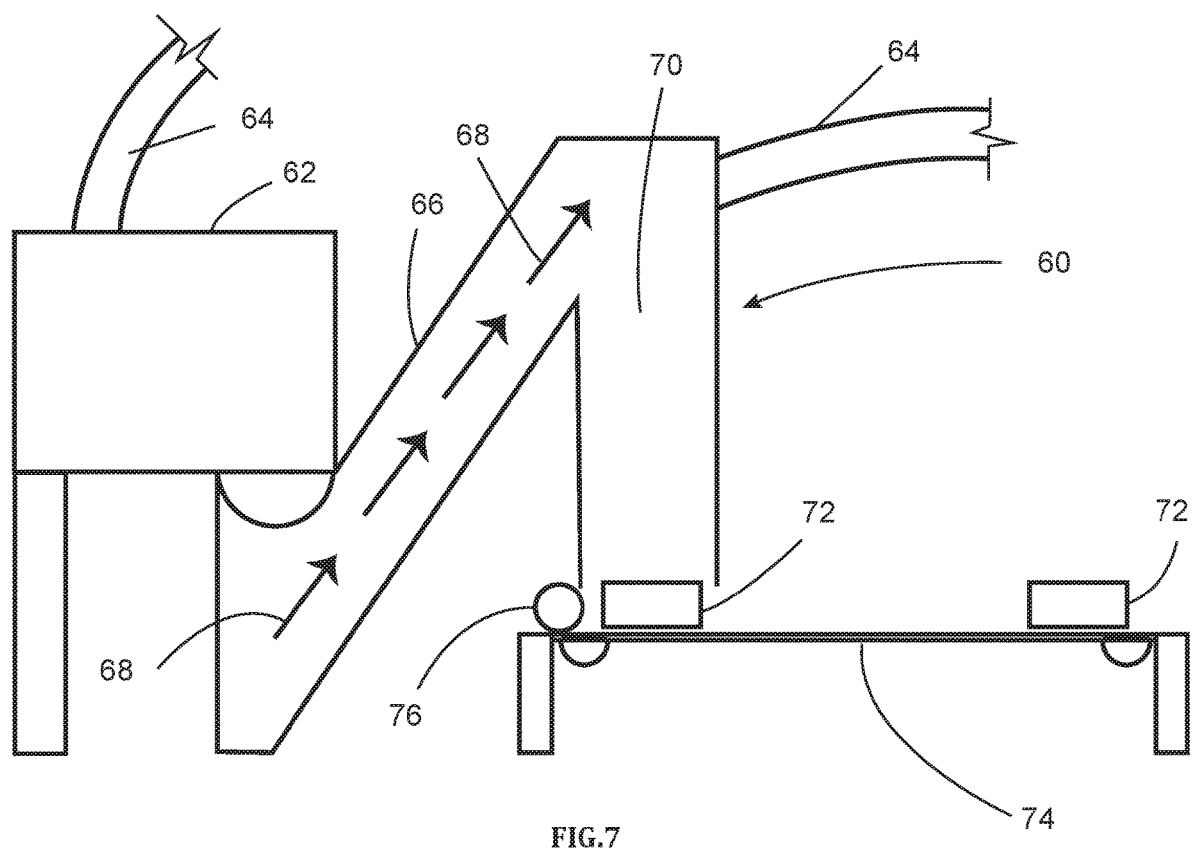
FIG. 7 is a bagging machine in association of one embodiment of a method disclosed herein.

Referring to FIG. 7, shown therein is bagger 60 for use in the vacuuming step and the bagging step. The bagger 60 includes a bagging bin 62 and ducts 64. Hammer milled trees 10 are moved from the bedding bin 54 (see FIG. 5) to the bagging bin 62. The processed trees 10 then enter the conveyer 66 along arrows 68 to the compactor 70. In a presently preferred embodiment, the ducts 64 are attached to air handling equipment (not shown) to create a vacuum or suction, thereby vacuuming dust from processed trees 10. Although two ducts 64 are shown in FIG. 7, the present invention is not so limited, as more or fewer ducts can be added to vacuum dust from the processed trees 10. For example, additional ducts could be added to the bagging bin 64, the conveyer 66, and the compactor 70.

Still referring to FIG. 7, in a presently preferred embodiment the processed trees 10 enter the compactor 70 and are formed into bales such as shown by reference number 72. After the processed trees 10 are compacted into bales 72, each bale drops out of the compactor 70 onto the conveyer 74. A roll of bags 76 is preferably located adjacent to the compactor 70 so that the bales 72 are placed in the bags and moved along the conveyer 74 to be prepared for use and transport.

Thus, by using the disclosed method, bedding is produced that minimizes dust and allergens, creates efficiencies in the production of bedding and other materials during the process, and creates a clean and healthy product for use in a variety of activities, including animal related activities that promote robust growth and overall good health. The steps are designed to extract, vacuum, filter, and avoid the presence of dust and particulate in the products produced. All of the tree, produced product, and waste product is used or usable. Different products can be derived during the process for different uses.

What is claimed is:

1. A method for producing animal bedding, the method comprising the steps of:
cutting a juniper tree at ground level, the juniper tree having needles, a trunk and limbs;
naturally drying the juniper tree until the needles are brown;
grinding the dried juniper tree using a screen less than 3 inches;
hammer milling the ground juniper tree;
extracting dust of 20 mesh minus from the hammer milled tree;
placing the hammer milled juniper tree in a bagging machine and vacuuming dust from the hammer milled juniper tree; and
bagging the hammer milled juniper tree.

2. The method of claim 1, wherein the juniper tree is a *Juniperus virginiana*.

3. The method of claim 1, wherein the grinding step includes grinding the needles, the trunk and the limbs of the cut juniper tree.

4. The method of claim 1, wherein the juniper tree is dried until the water content is 20% or less.

5. The method of claim 1 wherein the hammer milling step includes the use of a ½ inch screen.

6. The method of claim 1, wherein the dust is extracted using a cyclone and a baghouse.

7. The method of claim 6, wherein the baghouse includes a motorized fan to extract the dust.

8. A method for processing juniper trees, the method comprising the steps of:
cutting the juniper trees at ground level;
naturally reducing water content of the trees to 20% or less;
grinding the dried juniper trees;
hammer milling the ground juniper trees;
extracting dust of 20 mesh minus from the hammer milled juniper trees;
vacuuming dust from the hammer milled juniper trees; and
bagging the vacuumed hammer milled juniper trees.

9. The method of claim 8 wherein the step of reducing water content comprises laying the cut juniper trees on the ground.

10. The method of claim 8, wherein the juniper trees are a *Juniperus virginiana*.

11. The method of claim 8, wherein the juniper trees are ground using a screen less than 2.5 inches.

12. The method of claim 8, wherein the hammer milled juniper trees are bagged using a compression bagger.

13. The method of claim 8, wherein the dust is extracted using a baghouse vortex.

14. A method of producing animal bedding from juniper trees having a trunk, limbs and needles, the method comprising the steps of:
- naturally drying the juniper trees until the needles are brown;
- grinding the dried trees using a screen less than 3 inches;
- hammer milling the ground juniper trees using a ½ inch screen;
- extracting dust of 20 mesh minus from the hammer milled juniper trees;
- placing the hammer milled juniper trees in a compression bagging machine and vacuuming dust from the hammer milled juniper trees; and
- bagging the hammer milled juniper trees in the compression bagging machine.

15. The method of claim 14, wherein the drying step takes at least 3 months.

16. The method of claim 14, wherein the dust is extracted during the hammer milling step using a vortex.

17. The method of claim 14 wherein the bedding is packaged as a compressed bale.

18. The method of claim 14 wherein dust is vacuumed from the hammer milled juniper trees in the compression bagging machine at more than one location.

19. The method of claim 14, wherein the dust is extracted from the hammer milled juniper trees using a baghouse.

20. The method of claim 19, wherein the baghouse includes a fan to extract the dust.

\* \* \* \* \*